United States Patent
Kanamura et al.

(10) Patent No.: US 11,139,534 B2
(45) Date of Patent: Oct. 5, 2021

(54) LITHIUM SECONDARY BATTERY SEPARATOR AND METHOD OF MANUFACTURING SAME

(75) Inventors: Kiyoshi Kanamura, Hachioji (JP); Hirokazu Munakata, Hachioji (JP); Yongcheng Jin, Hachioji (JP)

(73) Assignees: TOKYO METROPOLITAN UNIVERSITY, Tokyo (JP); 3DOM INC., Sagamihara (JP)

(*) Notice: Subject to any disclaimer, the term of this patent is extended or adjusted under 35 U.S.C. 154(b) by 0 days.

(21) Appl. No.: 14/363,713

(22) PCT Filed: Dec. 9, 2011

(86) PCT No.: PCT/JP2011/079125
§ 371 (c)(1),
(2), (4) Date: Jun. 6, 2014

(87) PCT Pub. No.: WO2013/084368
PCT Pub. Date: Jun. 13, 2013

(65) Prior Publication Data
US 2014/0329130 A1 Nov. 6, 2014

(51) Int. Cl.
*H01M 50/449* (2021.01)
*H01M 10/052* (2010.01)
(Continued)

(52) U.S. Cl.
CPC ....... *H01M 50/449* (2021.01); *H01M 10/052* (2013.01); *H01M 10/4235* (2013.01); *H01M 50/403* (2021.01); *H01M 50/411* (2021.01)

(58) Field of Classification Search
CPC ............. H01M 2/1686; H01M 50/403; H01M 50/411; H01M 50/449; H01M 10/052; H01M 10/4235; Y02E 60/10
See application file for complete search history.

(56) References Cited

U.S. PATENT DOCUMENTS 3,179,634 A * 4/1965 Edwards ................ C08G 73/10
156/331.5
6,447,958 B1 9/2002 Shinohara et al.
(Continued)

FOREIGN PATENT DOCUMENTS

DE 199 18 856 A1 11/1999
JP 10302749 A * 11/1998
(Continued)

OTHER PUBLICATIONS

Wang, C. et al. "Simple Method for Preparation of Porous Polyimide Film with an Ordered Surface Based on in Situ Self-Assembly of Polyamic acid and Silica Microspheres", Langmuir, vol. 26, p. 18357-18361, published Nov. 10, 2010.*
(Continued)

*Primary Examiner* — Miriam Stagg
*Assistant Examiner* — Lilia Nedialkova

(57) ABSTRACT

Provided is a lithium secondary battery separator including a laminate of a substrate and a porous heat-resistant polyimide film which covers at least one surface of the substrate. The porous heat-resistant polyimide film has pores which are regularly arrayed three-dimensionally and a film thickness of 5-20 μm. Penetration damage to the separator by growth of dendrite-shaped lithium is avoided, and it is also possible to meet a request which is demanded of the lithium secondary battery separator.

9 Claims, 6 Drawing Sheets
(5 of 6 Drawing Sheet(s) Filed in Color)

Production of polyimide-coated polypropylene separator

15 μm-thick polyimide film

Substrate

(51) Int. Cl.
  *H01M 50/403* (2021.01)
  *H01M 50/411* (2021.01)
  *H01M 10/42* (2006.01)

(56) References Cited

U.S. PATENT DOCUMENTS

| | | | |
|---|---|---|---|
| 2003/0129379 A1 | 7/2003 | Yao et al. | |
| 2004/0242794 A1* | 12/2004 | Kanazawa | B01J 20/26 525/327.3 |
| 2006/0199294 A1* | 9/2006 | Fujikawa | H01M 2/16 438/42 |
| 2008/0261106 A1 | 10/2008 | Yang | |
| 2010/0026240 A1* | 2/2010 | Jiang | H01M 10/0525 320/116 |
| 2010/0068612 A1* | 3/2010 | Nishikawa | H01M 2/145 429/129 |
| 2010/0304205 A1* | 12/2010 | Jo | H01G 9/02 429/144 |

FOREIGN PATENT DOCUMENTS

| | | |
|---|---|---|
| JP | 2008-34212 | 2/2008 |
| JP | 2011-60539 | 3/2011 |
| JP | 2011-111470 | 6/2011 |
| WO | WO 2008/018657 A1 | 2/2008 |

OTHER PUBLICATIONS

Wang, C., et al. "Shell-core-corona aggregates formed from poly-(styrene)-poly(4-vinylpyridine) block copolymer induced by added homopolymer via interpolymer hydrogen-bonding", Polymer, vol. 50, pp. 5268-5275, published Sep. 15, 2009.*
Machine translation of Japanese Patent Publication No. JP 10-302749 A, published Nov. 13, 1998.*
Ratta, Varun. "Crystallization, Morphology, Thermal Stability and Adhesive Properties of Novel High Performance Semicrystalline Polyimides", Chapter 1, Ph.D. Thesis. Virginia Polytechnic Institute and State University, Apr. 1999.*
Munakata, H., et al. "3DOM Separator for Rechargeable Lithium Metal Batteries", 15th International Meeting on Lithium Batteries, IMLB 2010, Jun. 28, 2010.*
Extended European Search Report dated Apr. 30, 2015 in corresponding European Patent Application No. 11877034.6.
T. Hirai et al., "Influence of Electrolyte on Lithium Cycling Efficiency with Pressurized Electrode Stack", *Journal of the Electrochemical Society*, vol. 141, No. 3, Mar. 1994, pp. 611-614.
H. Mukaibo et al., "Structural and Morphological Modifications of a Nanosized 62 Atom Percent Sn—Ni Thin Film Anode during Reaction with Lithium", *Journal of the Electrochemical Society*, vol. 152, No. 3, Jan. 2005, pp. A560-A565.
International Search Report dated Apr. 17, 2012 in corresponding International Patent Application No. PCT/JP2011/079125.

* cited by examiner

Figure 1
--Prior Art--
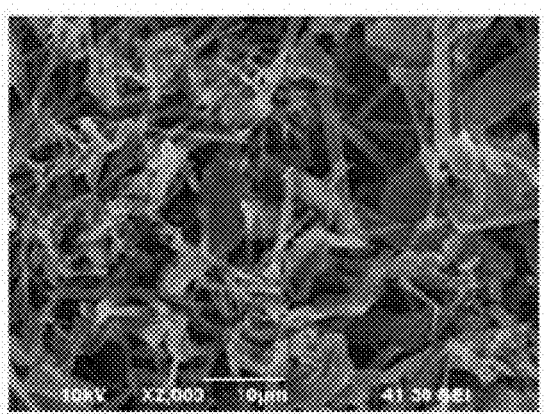
Production of polyimide-coated polypropylene separator
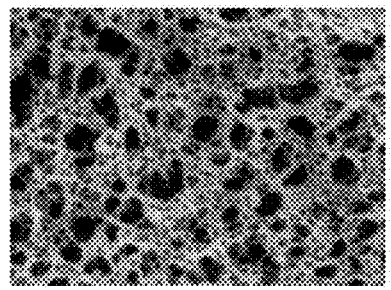
Figure 2A
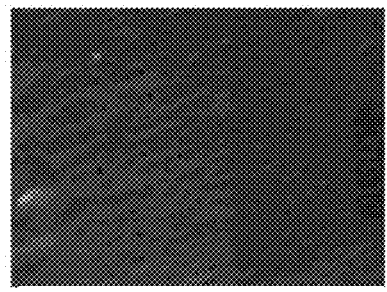
Figure 2B
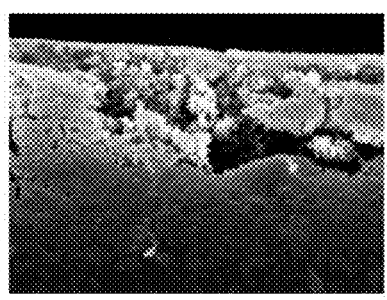
15 μm-thick polyimide film
Substrate
Figure 2C

PI coating on surface of filter paper (PTFE)

(a) Surface of PI (b) Cross section of PI/PTFE (c) Cross section of PI/PTFE $SiO_2$: 280 nm
Filter paper (PTFE): 0.1 μm pores
Thermal treatment: 230°C/4h Charge and discharge experiment in symmetric-cell with PP/PI

LITHIUM SECONDARY BATTERY SEPARATOR AND METHOD OF MANUFACTURING SAME

CROSS-REFERENCE TO RELATED APPLICATIONS

This application is a U.S. national stage application of PCT/JP2011/079125 filed Dec. 9, 2011, the contents of which are incorporated herein by reference.

TECHNICAL FIELD

The present invention relates to a lithium secondary battery separator and a method of manufacturing the separator. More particularly, the present invention relates to a lithium secondary battery separator formed by coating a substrate with a porous heat-resistant polyimide film having three-dimensionally ordered pores, and to a method of manufacturing the separator.

BACKGROUND ART

In recent years, along with the trends toward the downsizing of electronic devices, their increased portability and the practical use of electric cars, researches and developments of lithium secondary batteries that satisfy demands for high efficiency, high output, high energy density, and reductions in weight and size are being advanced. A lithium secondary battery has a structure that prevents short circuit by separating a cathode from an anode by an organic electrolyte solution-containing porous polymer film that serves as a separator. However, an overly thick separator film increases ohmic resistance and a battery having such a separator does not work; thus, a common separator film has a thickness of several ten to several hundred micrometers. The basic functions of a lithium secondary battery separator are, for example, to prevent short circuit by separating a cathode from an anode as well as to ensure high ionic conductivity by retaining an electrolyte needed for battery reaction and to possess a property to prevent the passage of substances that inhibit battery reaction and a property to interrupt current to ensure safety. In general, a conventional separator consists of a microporous polymer film having random pores with a porosity of about 40%. A lithium secondary battery using a lithium-transition metal oxide as a cathode, metal lithium as an anode, and a solution of a lithium salt in a non-aqueous organic solvent as an electrolyte solution has good ionic conductivity and negligibly low electric conductivity. Lithium ions migrate from the cathode to the anode during charge, while they migrate in the opposite direction, back to the cathode during discharge. On the lithium metal surface, a surface coating called SEI (Solid Electrolyte Interface) is generated unevenly, causing nonuniform current distribution. It is presumed that nonuniform current distribution caused by lithium ions through a separator having random pores acts on a lithium reaction layer with nonuniform current distribution, thus causing localized lithium dendrite growth. More specifically, it is presumed that when the electrodeposition reaction of lithium occurs under ion diffusion control, the random pores cause the current density of lithium ions to increase locally, which allows lithium dendrites to grow so that they penetrate the separator, causes short circuit between electrodes, and disables the separator from working. It is known that when lithium metal is used as an anode, dendritic lithium metal (FIG. 1) is deposited on the surface of the lithium metal anode (Non-patent Document 1). The present inventors found out that this dendritic lithium metal generally grows to about 1 to about 3 μm due to repeated charge and discharge, penetrates a separator, and causes short circuit and ignition.

Studies have been conducted until now as to, for example, a method of improving lithium deposition form by using an additive that acts effectively on lithium metal surface as a method of suppressing the generation of dendritic lithium metal, and pressure effect that suppresses the detachment of lithium dendrites by pressing a separator against a lithium metal anode (Non-patent Document 2). Nevertheless, such studies have not led to effective performance improvement. The present inventors have proposed a separator consisting of a porous resin film having pores ordered three-dimensionally (3DOM structure) to form a hexagonal close-packed structure (Patent Document 1). This separator provides a homogeneous space with three-dimensionally ordered pores having a diameter of 50 to 2500 nm and, hence, the diffusion of lithium ions is controlled, ion current density is made uniform, and lithium deposition reaction is uniformly controlled, which can suppress the formation and growth of dendritic lithium. Since this separator has a porosity of 60% or higher, it can be filled with a large amount of an electrolyte solution, thus achieving high ionic conductivity. However, a disadvantage of this separator is its high production cost since the separator consists of a porous resin film having a thickness of 30 to 500 μm.

A lithium secondary battery separator is required to have various properties such as film thickness (thinness), mechanical strength, ionic conductivity (when an electrolyte solution is contained), electric insulation, resistance to electrolyte solution, shutdown effect, electrolyte solution-retaining property, and wettability. Thus, it is necessary to avoid the penetration of separators due to the growth of dendritic lithium as well as fulfill the requirements for lithium secondary battery separators.

CITATION LIST

Patent Document

Patent Document 1: JP 2011-60539 A

Non-Patent Documents

Non-patent Document 1: H. Mukaibo, T. Momma, M. Mohamedi, T. Osaka, Journal of the Electrochemical Society, 152(2005) pp. A560-A565

Non-patent Document 2: T. Hirai, I. Yoshimatsu, J. Yamaki, Journal of the Electrochemical Society, 141(1994) pp. 611-614

SUMMARY

Accordingly, the present invention aims to provide a lithium secondary battery separator that can avoid being penetrated due to the growth of dendritic lithium and that can fulfill the requirements for the separator itself. The present invention also aims to provide a method of manufacturing the separator.

The present invention provides a lithium secondary battery separator comprising a laminate consisting of a substrate and a porous heat-resistant polyimide film that coats at least one of the surfaces of the substrate, wherein the polyimide film has three-dimensionally ordered pores and a film thickness of 5 to 20 μm. In the separator of the present invention, the "three-dimensionally ordered" pores mean adjacent pores aligned regularly in communication with each other. The most preferable three-dimensional alignment is a hexagonal close-packed structure.

The porous heat-resistant polyimide film is preferably provided on the substrate's surface that faces toward an anode of the lithium secondary battery.

The substrate is preferably selected from polypropylene, aramid, cellulose, and polytetrafluoroethylene.

The present invention also provides a method of manufacturing the lithium secondary battery separator, comprising: applying a polyimide precursor slurry containing uniformly dispersed silica particles having an identical average particle size to at least one of the surfaces of the substrate, then subjecting the slurry to a cyclodehydration reaction for polyimidization to form a 5 to 20 μm-thick silica-polyimide film containing three-dimensionally ordered silica particles, and removing the silica particles from the silica-polyimide film.

It is preferred that the polyimide precursor slurry is a polyamide acid solution comprising an acid anhydride, preferably a tetracarboxylic acid component, more preferably an aromatic tetracarboxylic acid component, and a diamine component, preferably an aromatic diamine component.

The silica particles preferably have a median average particle size selected from the range of 50 to 2500 nm, preferably 100 to 2000 nm, more preferably 150 to 1500 nm.

The silica-polyimide film desirably contains the silica particles in a concentration of 70 to 80 vol. %, preferably 72 to 76 vol. %, more preferably 74 to 75 vol. %.

The removal of the silica particles is preferably performed by contacting the substrate on which the silica-polyimide film has been formed with hydrofluoric acid.

When the substrate is hydrophobic, it is preferably hydrophilized before the application of the slurry in which a polyimide precursor has been dispersed.

The present invention further provides a lithium secondary battery comprising the lithium secondary battery separator and an anode composed of lithium metal. The battery may use a cathode and non-aqueous electrolyte solution that are used in conventional lithium secondary batteries.

Advantageous Effects

Since the lithium secondary battery separator of the present invention has a porous heat-resistant polyimide film having three-dimensionally ordered pores and a film thickness of 5 to 20 μm, ion current density can be more uniform, the growth of dendritic lithium can be suppressed, and the separator can be thinner.

Since the lithium secondary battery separator has a homogenized space in the porous heat-resistant polyimide film, the present invention can provide a lithium secondary battery that controls the diffusion of lithium ions, has prominent cycle characteristics and causes no dendritic lithium-induced short circuit between the cathode and the anode.

The porous heat-resistant polyimide film in the lithium secondary battery separator of the present invention has pores ordered three-dimensionally such that the adjacent pores are ordered in communication with each other, preferably pores that constitute a hexagonal close-packed structure. Hence, a very high theoretical porosity of 70% or higher can be obtained, a large amount of an electrolyte solution can be filled, and high ionic conductivity is obtained. The three-dimensionally ordered pores (preferably, the hexagonal close-packed pores) can make the current distribution of lithium ions uniform, allow the deposition reaction of lithium metal to be performed uniformly and slowly, and allow the deposition of granular lithium metal, generating no dendrites. Since the diffusion of lithium ions is made uniform, ion current density is made uniform and electrodeposition reaction of lithium is controlled uniformly, even under diffusion control. Further, the three-dimensionally ordered pore structure makes ion current density uniform, and this enables the uniform control of the electrodeposition reaction of lithium and the improvement of the cycle characteristics of a secondary battery using a lithium metal anode, even under charge and discharge conditions with high current density.

Moreover, in accordance with the method of manufacturing a porous heat-resistant polyimide film of a lithium secondary battery separator according to the present invention, a film having the features of an inexpensive general separator and those of the thin porous heat-resistant polyimide film can be manufactured. For example, it is possible to manufacture an inexpensive separator having the high mechanical strength and shutdown function of a general separator and the function to suppress the growth of dendritic lithium, which is a function of the thin porous heat-resistant polyimide film.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 1 is an electron micrograph showing the formation of dendritic lithium in a conventional lithium secondary battery using lithium metal as an anode.

FIG. 2A is an electron micrograph of the surface of the polyimide film in the lithium secondary battery separator produced in Example 1.

FIG. 2B is an electron micrograph of the back surface of the substrate in the separator.

FIG. 2C is an electron micrograph of the cross section of the separator.

DESCRIPTION OF EMBODIMENTS

Figure 3:
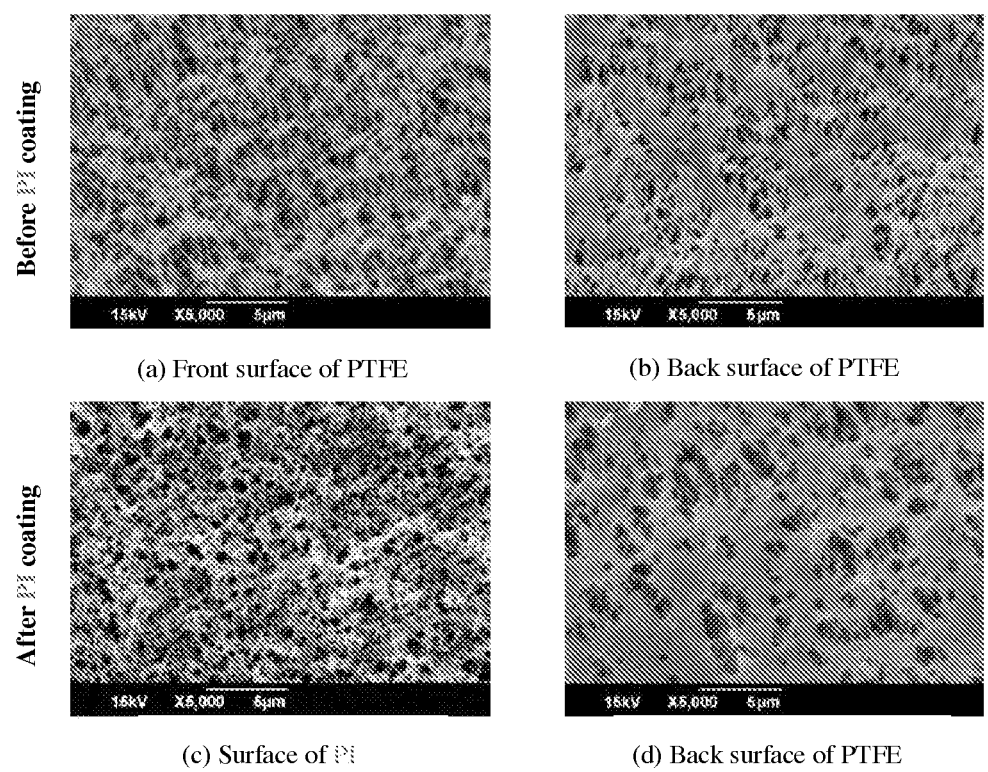
FIG. 3A is an electron micrograph of the front surface of the substrate used in Example 2.
FIG. 3B is an electron micrograph of the back surface of the substrate.
FIG. 3C is an electron micrograph of the surface of the polyimide film in the lithium secondary battery separator produced in Example 2.
FIG. 3D is an electron micrograph of the back surface of the substrate in the separator produced in Example 2.
Figure 4:
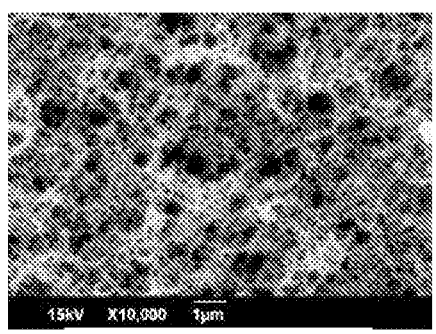
FIG. 4A is an electron micrograph of the surface of the polyimide film in the separator produced in Example 2.
FIG. 4B is an electron micrograph of the cross section of the polyimide film.
FIG. 4C is an electron micrograph showing a partially magnified image of FIG. 4B.
Figure 4:
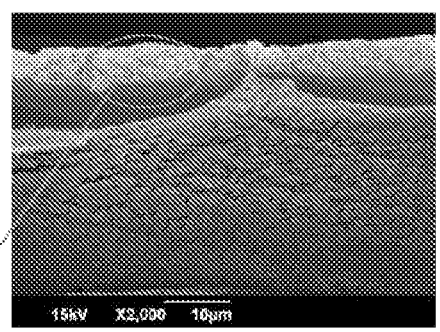
Figure 4:
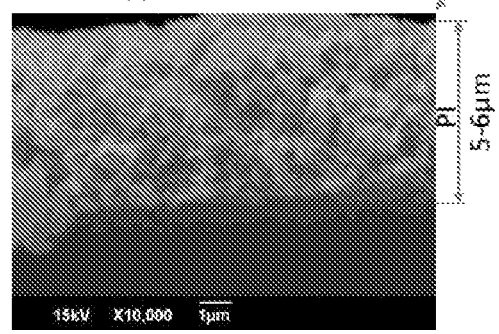
Figure 5:
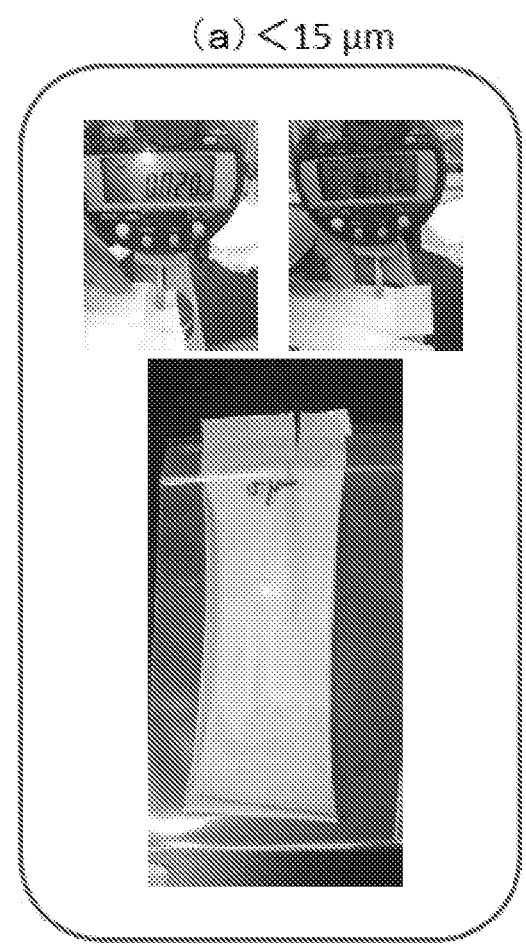
FIG. 5 is photographs showing a substrate coated with a porous heat-resistant polyimide film and a measurement of its film thickness.

The present invention will be described in more detail below with reference to the attached drawings, but the present invention is not limited thereto.

The secondary battery separator of the present invention is particularly suitable for lithium secondary batteries using lithium metal as an anode. The separator suppresses the formation of dendritic lithium from the lithium metal anode and prevents dendrite-induced short circuit between the anode and a cathode, thus providing a lithium secondary battery with good cycle characteristics.

<Lithium Secondary Battery Separator>

The lithium secondary battery separator of the present invention comprises a laminate consisting of a substrate and a porous heat-resistant polyimide film that coats at least one of the surfaces of the substrate. The polyimide film has three-dimensionally ordered pores and a film thickness of 5 to 20 µm.

The polyimide film has a three-dimensionally ordered structure where adjacent pores are ordered in communication with each other, preferably a hexagonal close-packed, three-dimensionally ordered structure. The porosity of the polyimide film is 70% to 90%, preferably 72% to 85%, more preferably 74%. A porosity exceeding 90% is not preferred because the strength of the film is lower. The size of each pore is preferably smaller than about 1 to about 3 µm, which is the size of lithium dendrites. The pore size is generally preferably about 50 to about 2500 nm, more preferably 100 to 2000 nm, even more preferably 150 to 1500 nm. The porosity and pore size of the porous heat-resistant polyimide film are determined according to the content of the silica particles in the silica-polyimide film and their average particle size, respectively. Each continuous hole that connects the adjacent pores preferably has a size smaller than the pore size (the maximum diameter of the pores) and has a bottleneck shape. The size of the continuous holes, which varies with the pore size and is not particularly limited, is generally about ½ to about 1/100 of the pore size, more preferably ⅓ to 1/10 of the pore size. The concrete values of the continuous hole size are, for example, about 20 to about 1000 nm, more preferably about 30 to about 500 nm. When the continuous hole size is too large, dendrites can possibly be generated. In contrast, the continuous hole size is too small, ionic conductivity can possibly decrease. Since the separator is expected to retain an electrolyte solution, it is preferably formed of a material having a prominent solution-retaining property.

The porous heat-resistant polyimide film is provided on at least one of the surfaces of the substrate, preferably on the surface that faces toward the anode of the lithium secondary battery, so that the polyimide film can suppress the generation of lithium dendrites from the lithium metal anode.

The substrate is preferably selected from polypropylene, aramid, cellulose, and polytetrafluoroethylene. The thickness of the substrate is preferably within the range of 10 to 300 µm, more preferably 15 to 100 µm, even more preferably 20 to 50 µm. If the substrate is thinner than the lower limit, the strength of the lithium secondary battery separator cannot be secured. In contrast, if the substrate is thicker than the upper limit, the entire separator can be too thick, increasing ohmic resistance and making any battery unsuitable for use.

<Method of Manufacturing Lithium Secondary Battery Separator>

The lithium secondary battery separator of the present invention is formed by applying a polyimide precursor slurry containing uniformly dispersed silica particles having an identical average particle size to at least one of the surfaces of the substrate, then subjecting the slurry to a cyclodehydration reaction for polyimidization to form a 5 to 20 µm-thick silica-polyimide film containing three-dimensionally ordered silica particles, and finally removing the silica particles from the silica-polyimide film.

The three-dimensionally ordered pores of the porous heat-resistant polyimide film are formed by the removal of the silica particles contained in the slurry in which a polyimide precursor has been dispersed. Hence, the alignment of the silica particles in the slurry is important. The average size (median size) of the silica particles is preferably within the range of 50 to 2500 nm, more preferably 100 to 2000 nm, even more preferably 150 to 1500 nm. It is necessary for the silica particles contained in the slurry to have nearly identical average particle sizes in order to form the three-dimensionally ordered pores of the porous heat-resistant polyimide film. If the average particle sizes differ greatly, regularly aligned pores cannot be obtained. Further, the pore size obtained after the removal of the silica particles used is somewhat smaller than the average size of the silica particles because of, for example, the shrinkage of the polyimide film. The average size of the silica particles may be determined based on the porosity and pore size that are finally required for the polyimide film to have and the shrinkage of polyimide. To obtain a porosity of 70% or higher to 90% or lower, it is preferred that the silica-polyimide film contains 70 to 80 vol. % of silica particles.

The hexagonal close-packed, three-dimensionally ordered silica particles can be obtained by appropriate control of the viscosity of the polyimide precursor slurry and the content of silica particles. To obtain the hexagonal close-packed structure, it is desirable that the viscosity of the polyimide precursor slurry should be within the range of 10 to 3000 poise, preferably 50 to 2000 poise, more preferably 100 to 1500 poise, and that the content of silica particles should be within the range of 1 to 50 vol. %, preferably 5 to 30 vol. %, more preferably 10 to 20 vol. %.

The polyimide precursor slurry is preferably a polyamide acid solution comprising an acid anhydride component and a diamine component.

The acid anhydride is not particularly limited, but may be, for example, an acid dianhydride. Preferred examples of the acid dianhydride include ethylenetetracarboxylic dianhydride, butanetetracarboxylic dianhydride, cyclopentanetetracarboxylic dianhydride, cyclohexanetetracarboxylic dianhydride, 1,2,4,5-cyclohexanetetracarboxylic dianhydride, 1,2,3,4-cyclohexanetetracarboxylic dianhydride, pyromellitic dianhydride ((1,2,4,5-benzenetetracarboxylic-1,2,4,5-dianhydride)), 1,1-bis(2,3-dicarboxyphenyl) ethane dianhydride, bis(2,3-dicarboxyphenyl) methane dianhydride, bis(3,4-dicarboxyphenyl) methane dianhydride, 3,3',4,4'-biphenyltetracarboxylic dianhydride, 2,2',6,6'-biphenyltetracarboxylic dianhydride, 2,2-bis(3,4-dicarboxyphenyl) propane dianhydride, 2,2-bis(2,3-dicarboxyphenyl) propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, bis(3,4-dicarboxyphenyl) sulfone dianhydride, bis(3,4-dicarboxyphenyl) ether dianhydride, bis(2,3-dicarboxyphenyl) ether dianhydride, 3,3',4,4'-benzophenonetetracarboxylic dianhydride, 2,2',3,3'-benzophenonetetracarboxylic dianhydride, 4,4'-(p-phenylenedioxy) diphthalic dianhydride, 4,4'-(m-phenylenedioxy) diphthalic dianhydride, 1,2,5,6-naphthalenetetracarboxylic dianhydride, 1,4,5,8-naphthalenetetracarboxylic dianhydride, 2,3,6,7-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, and 4,4'-(9-fluorenylidene)diphthalic anhydride. These tetracarboxylic dianhydrides may be used singly or in combination of two or more.

As the diamine, fatty diamines, aromatic diamines and the like may be used singly or in combination. A preferred fatty diamine may be, for example, a fatty diamine having about 2 to about 15 carbon atoms. Specific examples may include pentamethylene diamine, hexamethylene diamine, and heptamethylene diamine. A preferred aromatic diamine may be a diamino compound having one phenyl group or about 2 to about 10 phenyl groups attached. Specific examples may include phenylenediamines and derivatives thereof, diaminodiphenyl compounds and derivatives thereof, diaminotriphenyl compounds and derivatives thereof, diaminonaphthalenes and derivatives thereof, aminophenylaminoindans and derivatives thereof, diaminotetraphenyl compounds and derivatives thereof, diaminohexaphenyl compounds and derivatives thereof, and cardo-type fluorenediamine derivatives. The phenylenediamines may be m-phenylenediamine, p-phenylenediamine and the like, and the phenylenediamine derivatives may be diamines to which an alkyl group such as a methyl group or an ethyl group has been attached, for example, 2,4-triphenylenediamine. The diaminodiphenyl compounds are obtained by the linkage of two aminophenyl groups via another group. The linkage is ether linkage, sulfonyl linkage, thioether linkage, linkage of alkylene or its derivative group, imino linkage, azo linkage, phosphine oxide linkage, amide linkage, ureylene linkage, or the like. The alkylene linkage is linkage of an alkylene having about 1 to about 6 carbon atoms, and its derivative group is an alkylene group whose one or more hydrogen atoms have been replaced by halogen atoms and/or the like. Examples of the diaminodiphenyl compounds may include 3,3'-diaminodiphenyl ether, 3,4'-diaminodiphenyl ether, 4,4'-diaminodiphenyl ether, 3,3'-diaminodiphenylsulfone, 3,4'-diaminodiphenylsulfone, 4,4'-diaminodiphenylsulfone, 3,3'-diaminodiphenylmethane, 3,4'-diaminodiphenylmethane, 4,4'-diaminodiphenylmethane, 4,4'-diaminodiphenyl sulfide, 3,3'-diaminodiphenyl ketone, 3,4'-diaminodiphenyl ketone, 2,2-bis(p-aminophenyl)propane, 2,2'-bis(p-aminophenyl)hexafluoropropane, 4-methyl-2,4-bis(p-aminophenyl)-1-pentene, 4-methyl-2,4-bis(p-aminophenyl)-2-pentene, iminodianiline, 4-methyl-2,4-bis(p-aminophenyl) pentane, bis(p-aminophenyl) phosphine oxide, 4,4'-diaminoazobenzene, 4,4'-diaminodiphenylurea, and 4,4'-diaminodiphenylamide. The diaminotriphenyl compounds are formed by linkage of two aminophenyl groups and one phenylene group, all of which are linked via another group. The "another group" is selected from the same groups as in the diaminodiphenyl compounds. Examples of the diaminotriphenyl compounds may include 1,3-bis(m-aminophenoxy)benzene, 1,3-bis(p-aminophenoxy)benzene, and 1,4-bis(p-aminophenoxy)benzene. Examples of the diaminonaphthalenes may include 1,5-diaminonaphthalene and 2,6-diaminonaphthalene. Examples of the aminophenylaminoindans may include 5- or 6-amino-1-(p-aminophenyl)-1,3,3-trimethylindan. Examples of the diaminotetraphenyl compounds may include 4,4'-bis(p-aminophenoxy) biphenyl, 2,2-bis[p-(p'-aminophenoxy)phenyl]propane and 2,2-bis[p-(p'-aminophenoxy)biphenyl]propane, and 2,2'-bis[p-(m-aminophenoxy)phenyl]benzophenone. An example of the cardo-type fluorenediamine derivatives is 4,4'-(9-fluorenylidene)dianiline Other examples may include compounds obtained by replacement of the hydrogen atom(s) of these aromatic diamines by at least one substituent selected from the group consisting of a halogen atom, a methyl group, a methoxy group, a cyano group, a phenyl group and the like.

A polyamide acid is a polymer of a tetracarboxylic acid and a diamine (polyamic acid) and is a polyimide precursor obtained by equimolar polymerization of at least one each of the tetracarboxylic acid and the diamine.

The solvent that constitutes the polyimide precursor slurry is not particularly limited unless it dissolves the silica particles and the substrate. Preferred examples of the solvent may include aprotic polar solvents such as N,N-dimethylformamide, N,N-dimethylacetamide and N-methyl-2-pyrrolidone; phenolic solvents such as cresols; and glycolic solvents such as Diglyme. These solvents may be used singly or in combination of two or more.

As mentioned above, the three-dimensionally ordered structure of the pores of the porous heat-resistant polyimide film can be adjusted by the control of the viscosity of the polyimide precursor slurry. The viscosity of the slurry can be adjusted according to the solvent and the polyamide acid content. For example, to form the hexagonal close-packed, three-dimensionally ordered structure, it is preferred that the polyimide precursor slurry is composed of an N,N-dimethylformamide solution of a polyamide acid consisting of a pyromellitic acid dihydrate and a diaminodiphenylether and 10 to 20 vol. % of silica particles contained in the solution, and that the viscosity of the slurry falls within the range of 100 to 1500 poise.

To apply the polyimide precursor slurry to the substrate, a general method of application may be used without limitation. In particular, the doctor blade method, the spray method or the injection method can be suitably used.

To apply the polyimide precursor slurry evenly to the substrate, it is preferred that the substrate is hydrophilic. When the substrate is hydrophobic, it is preferably hydrophilized before the application of the slurry in which a polyimide precursor has been dispersed. Suitable examples of the hydrophilization treatment may include plasma treatment, corona discharge, blasting, and primer treatment. Among them, the corona discharge method can be used suitably. For example, resins such as polypropylene and polyethylene have no polar group on their surface layers and, hence, they have problems with wettability, such as poor printability and poor adhesion properties. When the substrate is treated by corona discharge, the state of gas components such as oxygen changes into an active plasma state, and accelerated electrons in corona discharge collide with the resin surface, causing the scission of the molecular chains on the resin surface and the addition of an oxygen-containing functional group to the surface. As a result, a hydrophilic polar group (e.g., a hydroxyl group or a carbonyl group) is generated on the resin surface and the wettability of the surface is improved.

Next, the polyimide precursor slurry applied to the substrate is subjected to a cyclodehydration reaction for polyimidization to form a 5 to 20 μm-thick silica-polyimide film containing three-dimensionally ordered silica particles. The cyclodehydration reaction for polyimidization may be either thermal imidization or chemical imidization. A known method such as a method of imidizing a polyamic acid chemically or thermally to dissolve the resulting polyimide in an organic solvent may be used. In the thermal imidization reaction, for example, a method of heating the polyimide precursor slurry-applied substrate from room temperature to 375° C. for 3 hours and then retaining the substrate at 375° C. for 20 minutes, or a method of heating the substrate from room temperature to 375° C. in increments of 50° C. (and retaining the substrate for 20 minutes in each step) and finally retaining it at 375° C. for 20 minutes may be used. In the chemical imidization reaction, for example, a method of immersing the polyimide precursor slurry-applied substrate in an acetic anhydride or a mixture solvent of an acetic anhydride and isoquinoline may be used.

Finally, the silica particles are removed from the silica-polyimide film to form a porous heat-resistant polyimide film on the substrate. The removal of silica particles may be performed by immersing, in hydrofluoric acid, the substrate on which the silica-polyimide film has been formed.

<Lithium Secondary Battery>

The lithium secondary battery of the present invention will be described below. The battery consists of an anode plate composed of lithium, the lithium secondary battery separator of the present invention, a non-aqueous electrolyte solution composed of an aprotic organic solvent and a lithium salt, and a cathode plate as well as other constituents of the battery such as a gasket, a current collector, a sealing plate, and a cell case. The secondary battery of the present invention uses lithium metal as an anode and the separator of the present invention as a separator, and other constituents of the battery may be any conventionally known or well-known constituents. The shape of the battery may be any shape including a conventionally known shape such as a cylinder, a square or a rectangle, or a coin, and is not particularly limited. When the lithium secondary battery has, for example, a coin shape, the battery generally includes a cell base plate, an anode plate placed thereon, an electrolyte solution and a separator placed thereon, and a cathode placed thereon which is opposed to the anode, all of which are fixed together with a gasket and a sealing plate. Nevertheless, the structure of the lithium ion battery of the present invention or the method of producing the battery is not limited to the example mentioned above.

A material used as a cathode in the lithium secondary battery of the present invention is not particularly limited, but is preferably a metal chalcogen compound or the like which can occlude or emit lithium ions during charge or discharge. Examples of the metal chalcogen compound may include vanadium oxides, vanadium sulfides, molybdenum oxides, molybdenum sulfides, manganese oxides, chromium oxides, titanium oxides, titanium sulfides, and complex oxides thereof and complex sulfides thereof. Examples of these compounds may include $Cr_3O_8$, $V_2O_5$, $V_5O_{18}$, $VO_2$, $Cr_2O_5$, $MnO_2$, $TiO_2$, $MoV_2O_8$, $TiS_2V_2S_5MoS_2$, $MoS_3VS_2$, $Cr_{0.25}V_{0.75}S_2$, and $Cr_{0.5}V_{0.5}S_2$. Other examples may include $LiMY_2$ (M is a transition metal such as Co or Ni, and Y is a chalcogen such as O or S), $LiM_2Y_4$ (M is Mn and Y is O), oxides such as $WO_3$, sulfides such as CuS, $Fe_{0.25}V_{0.75}S_2$ and $Na_{0.1}CrS_2$, phosphorus-sulfur compounds such as $NiPS_8$ and $FePS_8$, selenium compounds such as $VSe_2$ and $NbSe_3$, and iron compounds such as iron oxides. Other preferred examples may include manganese oxides and lithium-manganese complex oxides having a spinel structure. Specific examples of the material may include $LiCoO_2$, $LiCo_{1-x}Al_xO_2$, $LiCo_{1-x}Mg_xO_2$, $LiCo_{1-x}Zr_xO_2$, $LiMn_2O_4$, $Li_{1-x}Mn_{2-x}O_4$, $LiCr_xMn_{2-x}O_4$, $LiFe_xMn_{2-x}O_4$, $LiCo_xMn_{2-x}O_4$, $LiCu_xMn_{2-x}O_4$, $LiAl_xMn_{2-x}O_4$, $LiNiO_2$, $LiNi_xMn_{2-x}O_4$, $Li_6FeO_4$, $NaNi_{1-x}Fe_xO_2$, $NaNi_{1-x}Ti_xO_2$, $FeMoO_4Cl$, $LiFe_5O_8$, $FePS_3$, $FeOCl$, $FeS_2$, $Fe_2O_3$, $Fe_3O_4$, β-FeOOH, α-FeOOH, γ-FeOOH, α-$LiFeO_2$, α-$NaFeO_2$, $LiFe_2(MoO_4)_3$, $LiFe_2(WO_4)_3$, $LiFe_2(SO_4)_3$, $Li_3Fe_2(PO_4)_3$, $Li_3Fe_2(AsO_4)_3$, $Li_3V_2(AsO_4)_3$, $Li_3FeV(AsO_4)_3$, $Li_{1.5}Al_{0.5}Ge_{1.5}(PO_4)_3$, $LiFePO_4$, $Li_2FeSiO_4$, $FeBO_3$, and $FeF_3$.

Examples of the non-aqueous solvent that can be used for the electrolyte solution in the lithium secondary battery of the present invention may include acetonitrile (AN), γ-butyrolactone (BL), γ-valerolactone (VL), γ-octanoic lactone (OL), diethyl ether (DEE), 1,2-dimethoxyethane (DME), 1,2-diethoxyethane (DEE), dimethyl sulfoxide (DMSO), 1,3-dioxolane (DOL), ethylene carbonate (EC), propylene carbonate (PC), dimethyl carbonate (DMC), diethyl carbonate (DEC), ethylmethyl carbonate (EMC), methyl formate (MF), tetrahydrofuran (THF), 2-methyl tetrahydrofuran (MTHF), 3-methyl-1,3-oxazolidin-2-one (MOX), and sulfolane (S). These solvents may be used singly or in combination of two or more.

Examples of the lithium salt used for the electrolyte solution in the lithium secondary battery may include lithium salts such as $LiPF_6$, $LiAsF_6$, $LiClO_4$, $LiBF_4$, $LiCF_3SO_3$, $Li(CF_3SO_2)_2N$, and $LiC_4F_9SO_3$. One or two or more of these salts are dissolved in the aforementioned non-aqueous solvent so that the salt(s) are contained in a concentration of about 0.5 to about 2.0 M to prepare a non-aqueous electrolyte solution.

Especially, in terms of particularly high performance, the electrolyte solution used in the lithium secondary battery using the separator of the present invention is preferably a non-aqueous electrolyte solution of 1 mol dm$^{-3}$ $LiClO_4$/EC (ethyl carbonate):DEC (diethyl carbonate)=1:1 or an electrolyte solution of 1 mol dm$^{-3}$ $LiClO_4$/EC (ethyl carbonate):DMC (dimethyl carbonate)=1:1.

EXAMPLES

The present invention will be described concretely below with reference to Examples, but is not limited thereto.

Example 1

A general polypropylene (PP) separator for lithium batteries (Celgard 2400, a product of Celgard, LLC) was used as a substrate. One of the surfaces of the polypropylene substrate was coated with a three-dimensionally ordered porous polyimide film (hereinafter, abbreviated as "3DOM PI film") by the process described below.

First, a homogenizer was used to disperse 5 g of spherical silica (Seahostar (registered trademark) KE-P30, which is a product of Nippon Shokubai Co., Ltd.; median average particle size: 280 nm) uniformly in 5 g of a dimethylacetamide (DMAc) solvent. To 10 g of this dispersion liquid was added 5.5 g of a polyamic acid solution (PMDA (pyromellitic acid dihydrate)/ODA (diaminodiphenyl ether), JFE Chemical Corporation) as a polyimide precursor, followed by homogeneous mixing with the defoaming and stirring device "Thinky Mixer" (a product of Thinky Corporation) to give a silica-polyimide precursor slurry.

Since the surfaces of the polypropylene substrate were hydrophobic, one of the surfaces of the substrate was physically treated with a device for corona discharge (Output voltage: 9 KV, Corona Fit CFG-500, Shinko Electric & Instrumentation Co., Ltd.) to improve the hydrophilicity of the surface.

To the hydrophilized surface of the substrate, the silica-polyimide precursor slurry was applied by the doctor blade method. After drying at 30° C. for 6 hours, the resulting film was immersed in a predetermined amount of an acetic anhydride (20 times larger than the amount of polyimide film applied) for 30 minutes or more, thereby causing chemical polyimidization of the polyimide precursor to form a PP/polyimide/silica composite film. The formed composite film was immersed in 10% hydrofluoric acid for 4 hours, thereby removing silica particles to give a PP separator coated with a 5 to 20 µm-thick 3DOM PI film. Electron micrographs of the surfaces and cross section of the 3DOM PI film-coated PP separator are shown in FIGS. 2A-2C.

Example 2

A polytetrafluoroethylene (PTFE) filter paper (Advantec, filter (0.1 µm)), which is a general porous film, was used as a substrate. One of the surfaces of the PTFE filter paper was coated with a three-dimensionally ordered porous polyimide film (3DOM PI film) by the process described below.

First, a homogenizer was used to disperse 5 g of spherical silica (Seahostar P-30, which is a product of Nippon Shokubai Co., Ltd.; average particle size: 280 nm) uniformly in 5 g of a dimethylacetamide (DMAc) solvent. To 10 g of this dispersion liquid was added 5.5 g of a polyamic acid solution (PMDA/ODA, JFE Chemical Corporation) as a polyimide precursor, followed by homogeneous mixing with the defoaming and stirring device "Thinky Mixer" (a product of Thinky Corporation) to give a silica-polyimide precursor slurry. Since the PTFE filter paper was hydrophilic, the silica-polyimide precursor slurry was applied to the surface of the filter paper by the doctor blade method without any surface treatment. After drying at 30° C. for 6 hours, thermal polyimidization was performed under the condition of 230° C./h. The produced PTFE/polyimide/silica composite film was immersed in 10% hydrofluoric acid for 4 hours to remove silica and give a PTFE separator coated with a 5 to 20 µm-thick 3DOM PI film. Electron micrographs of the surfaces and cross section of the 3DOM PI film-coated PTFE separator are shown in FIG. 3.

Example 3

Figure 6:
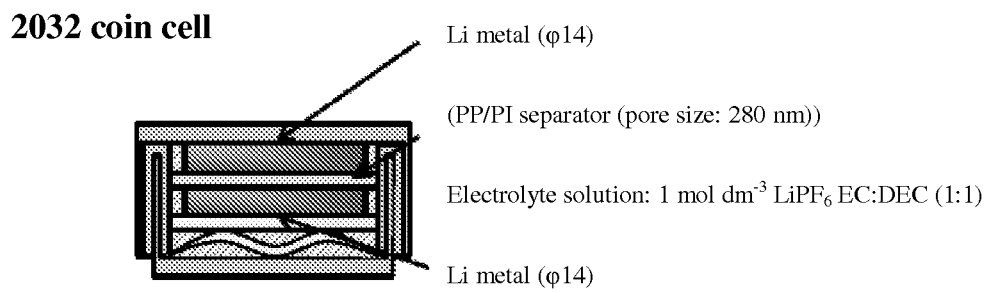
FIG. 6 is a cross sectional view of a coin-type lithium secondary battery in which the separator of the present invention which was produced in Example 1 has been built.

A lithium foil produced by Honjo Metal Co., Ltd. (film thickness: 600 µm) was punched with a diameter of 14 mm punch to prepare two pieces, and the lithium secondary battery separator produced in Example 1 (thickness of porous heat-resistant polyimide film: 15 µm) was punched with a diameter of 16 mm punch. A non-aqueous electrolyte solution of 1 mol dm$^{-3}$ LiPF$_6$/EC:DEC (1:1) was used. These materials were built in a 2032 coin cell produced by Hohsen Corp. in a glove box to produce the coin cell illustrated in FIG. 6.

Figure 7:
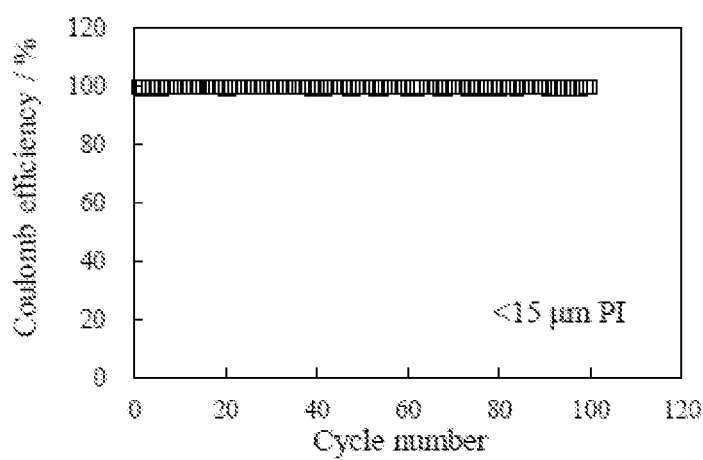
FIG. 7 is a graph showing the cycle characteristics (cycle number and coulombic efficiency) of the coin-type lithium secondary battery illustrated in FIG. 6.

A charge and discharge test was conducted using a battery charging and discharging device produced by Hokuto Denko Corp. (HJ1001SM8A). The test was conducted at a current density of 10.3 mAh cm$^{-2}$ for 30 minutes to evaluate cycle characteristics during 100 cycles. The coulombic efficiency in the test is shown in FIG. 7.

Comparative Example 1

When a 3DOM PI film was thickened to greater than 20 µm, an increase of ohmic resistance and a decrease of charge and discharge performance were confirmed.

The PP films having a 15 µm-thick PI film and a 40 µm-thick PI film, respectively, were used as separators to conduct a coin battery test. A LiNi$_{1/3}$Co$_{1/3}$Mn$_{1/3}$O$_2$ composite cathode and a metal lithium anode were placed oppositely via each separator, and an electrolyte solution (a mixture of 1 mol/L of LiPF$_6$ and ethylene carbonate:diethyl carbonate=1:1 (v/v)) was filled between the cathode and the anode to produce coin batteries having the same configuration as in FIG. 6. The capacity change of each of the produced coin batteries was measured after 1 to 3 cycles of charge and discharge. In the measurement, a battery charging and discharging device produced by Hokuto Denko Corp. (HJ1001SM8A) was used. After the batteries were charged to 4.3 V at a constant current at a current density of 5.3 mAcm$^{-2}$, they were charged at a constant potential of 4.3 V until the current density reached 0.53 mAcm$^{-2}$ or lower. Subsequently, they were discharged to 2.0 V at a constant current at a current density of 5.3 mAcm$^{-2}$. Charge and discharge capacities obtained were divided by the weight of the cathode active material to calculate each charge and discharge capacity per unit weight.

Figure 8A:
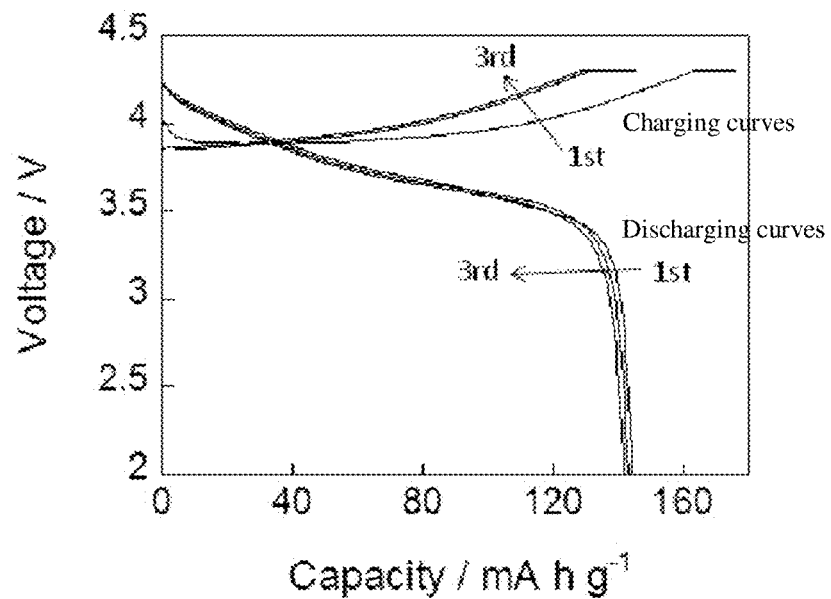
FIGS. 8A and 8B are graphs showing a comparison of charge and discharge capacity between a lithium secondary battery separator of the present invention (film thickness: 15 µm) and the separator of Comparative Example 1 (film thickness: 40 µm).
Figure 8B:
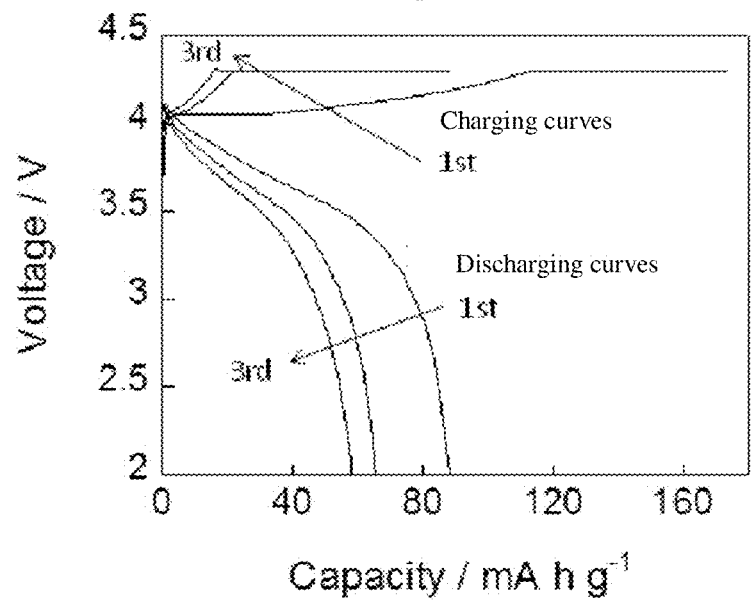

FIG. 8A is a graph showing the result of the charge and discharge test for the battery using, as a separator, the film having the PP substrate and a 15 µm-thick 3DOM PI film formed thereon. FIG. 8B is a graph showing the result of the charge and discharge test for the battery using, as a separator, the film having the PP substrate and a 40 µm-thick 3DOM PI film formed thereon. Each figure shows the battery capacity on the x-axis and the voltage on the y-axis. In each figure, the curves indicated by the up arrow are charging curves, while the curves indicated by the down arrow are discharging curves.

After the repeated charge and discharge from the 1$^{st}$ to 3$^{rd}$ cycles, a marked capacity decrease was observed in the battery having a 40 µm-thick 3DOM PI film (the lower figure), whereas almost no capacity decrease associated with the charge and discharge was observed in the battery having a 15 µm-thick 3DOM PI film (the upper figure). In the battery having the separator with a 15 µm-thick PI film, almost no battery capacity degradation was observed along with the increase of the charge and discharge cycle, and a high discharge capacity was maintained. In contrast, in the battery having the separator with a 40 µm-thick PI film, the internal resistance of the coin battery was high and the battery was not charged and discharged smoothly and, hence, a capacity decrease was observed. These results show that the PI film thickness of the separator, when applied to a battery, needs to be limited to 20 µm or less.

The invention claimed is:

1. A lithium secondary battery separator for a lithium secondary battery with an anode composed of lithium metal, the lithium secondary battery separator comprising:
   a laminate including
      a substrate including a material selected from polypropylene, aramid, cellulose, and polytetrafluoroethylene; and
      a porous heat-resistant polyimide film coating at least one surface of the substrate to face toward the anode composed of the lithium metal, to contact the lithium metal of the anode,
   the porous heat-resistant polyimide film having a film thickness of 5 µm to 20 µm and a porosity of 70% to 90%,
   the porosity being based on, in the porous heat-resistant polyimide film:
      three-dimensionally ordered pores constituting 70 vol. % to 80 vol. % of the porous heat-resistant polyimide film, each of the three-dimensionally ordered pores having a pore size of 50 nm to 2500 nm, and bottleneck-shaped continuous holes, each hole of the bottleneck-shaped continuous holes connecting, among the three-dimensionally ordered pores, pores adjacent to the hole, each hole having a hole size of 20 nm to 1000 nm.

2. A method of manufacturing the lithium secondary battery separator of claim 1, comprising:

applying a polyimide precursor slurry, which contains uniformly dispersed silica particles having a median particle size selected from a range of 50 nm to 2500 nm, to the at least one surface that is to face toward the anode composed of the lithium metal, the polyimide precursor slurry having a viscosity of 10 poise to 3000 poise and comprising 10 vol. % to 20 vol. % of the silica particles, drying the slurry to form a silica-polyimide precursor film, then, subjecting the silica-polyimide precursor film to a cyclodehydration reaction for polyimidization to form a 5 μm to 20 μm-thick silica-polyimide film containing three-dimensionally ordered silica particles constituting 70 vol. % to 80 vol. % of the silica-polyimide film, and removing the silica particles from the silica-polyimide film to form the porous heat-resistant polyimide film.

3. The method of claim 2, wherein the polyimide precursor slurry is a polyamide acid solution comprising an acid anhydride component and a diamine component.

4. The method of claim 3, wherein the substrate is hydrophilized before the applying the polyimide precursor slurry when the substrate is hydrophobic.

5. The method of claim 2, wherein the substrate is hydrophilized before the applying the polyimide precursor slurry when the substrate is hydrophobic.

6. The lithium secondary battery separator of claim 1, wherein the porous heat-resistant polyimide film is configured to suppress growth of dendritic lithium on the porous heat-resistant polyimide film.

7. The lithium secondary battery separator of claim 1, wherein the substrate includes:

the at least one surface including a first surface coated with the porous heat-resistant polyimide film to face toward the anode composed of the lithium metal, and a second surface opposite to the first surface to face away from the anode and not coated with the porous heat-resistant polyimide film.

8. A lithium secondary battery comprising:

an anode composed of lithium metal; and a lithium secondary battery separator including:

a laminate including a substrate including a material selected from polypropylene, aramid, cellulose, and polytetrafluoroethylene; and a porous heat-resistant polyimide film coating at least one surface of the substrate to face toward the anode composed of the lithium metal, to contact the lithium metal of the anode, having a film thickness of 5 μm to 20 μm and a porosity of 70% to 90%, the porosity being based on, in the porous heat-resistant polyimide film;

three-dimensionally ordered pores constituting 70 vol. % to 80 vol. % of the porous heat-resistant polyimide film, each of the three-dimensionally ordered pores having a pore size of 50 nm to 2500 nm, and bottleneck-shaped continuous holes, each hole of the bottleneck-shaped continuous holes connecting, among the three-dimensionally ordered pores, pores adjacent to the hole, each hole having a hole size of 20 nm to 1000 nm.

9. The lithium secondary battery according to claim 8, wherein the substrate includes:

the at least one surface including a first surface coated with the porous heat-resistant polyimide film to face toward the anode composed of the lithium metal, and a second surface opposite to the first surface to face away from the anode and not coated with the porous heat-resistant polyimide film.

\* \* \* \* \*

UNITED STATES PATENT AND TRADEMARK OFFICE
CERTIFICATE OF CORRECTION

PATENT NO.       : 11,139,534 B2
APPLICATION NO.  : 14/363713
DATED            : October 5, 2021
INVENTOR(S)      : Kanamura et al.

It is certified that error appears in the above-identified patent and that said Letters Patent is hereby corrected as shown below:

In the Claims

Column 14, Line 22, in Claim 8, delete "film;" and insert --film:--, therefor.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*